(12) United States Patent
Weber et al.

(10) Patent No.: US 10,953,249 B2
(45) Date of Patent: Mar. 23, 2021

(54) LOCKING DEVICE FOR A DAMPER ACTUATOR

(71) Applicant: BELIMO HOLDING AG, Hinwil (CH)

(72) Inventors: Beat Weber, Zurich (CH); Peter Dreher, Meilen (CH); Atilla Beker, Wetzikon (CH)

(73) Assignee: BELIMO HOLDING AG, Hinwil (CH)

( * ) Notice: Subject to any disclaimer, the term of this patent is extended or adjusted under 35 U.S.C. 154(b) by 374 days.

(21) Appl. No.: 15/121,833

(22) PCT Filed: Mar. 11, 2015

(86) PCT No.: PCT/EP2015/055072
§ 371 (c)(1),
(2) Date: Aug. 26, 2016

(87) PCT Pub. No.: WO2015/135988
PCT Pub. Date: Sep. 17, 2015

(65) Prior Publication Data
US 2017/0065839 A1    Mar. 9, 2017

(30) Foreign Application Priority Data
Mar. 12, 2014 (CH) ........................... 366/14

(51) Int. Cl.
*A62C 2/24* (2006.01)
*F16K 17/38* (2006.01)
(Continued)

(52) U.S. Cl.
CPC ............ *A62C 2/242* (2013.01); *F16K 17/386* (2013.01); *F16K 31/055* (2013.01); *F24F 11/30* (2018.01); *F24F 11/35* (2018.01)

(58) Field of Classification Search
CPC .. A62C 2/24; A62C 2/242; F24F 11/30; F24F 11/35; F16K 17/386; F16K 31/055; F16K 17/38
(Continued)

(56) References Cited

U.S. PATENT DOCUMENTS 3,499,231 A * 3/1970 Mullaney .................. D21F 5/00
34/553
3,543,439 A * 12/1970 Pantland ................... A62C 2/14
49/7

(Continued)

FOREIGN PATENT DOCUMENTS

CN         101668916 B      7/2017
DE         31 26 214 A1     1/1983
(Continued)

OTHER PUBLICATIONS

International Search Report of PCT/EP2015/055072, dated Jun. 11, 2015. [PCT/ISA/210].
(Continued)

*Primary Examiner* — Jessica Yuen
(74) *Attorney, Agent, or Firm* — Sughrue Mion, PLLC (57) ABSTRACT

The present invention relates to a blocking device (4) for a damper drive, wherein the blocking device (4) can be transferred by activation from an inoperative state into an alternative activated state. The blocking device (4) comprises a movably mounted blocking element (41) which, in a blocking position, blocks an output member (13) in a safety position. The blocking device (4) further comprises a drive element (42) which, when the blocking device (4) is activated, moves the blocking element (41) into the blocking position. The blocking device further comprises an activating element (43) which, when a blocking temperature has been exceeded, activates the blocking device (4) by an irreversible change in shape. Also disclosed are a damper (Continued)

drive with a blocking device, a fire protection device and a method for operating a fire protection device.

16 Claims, 7 Drawing Sheets

(51) Int. Cl.
*F16K 31/05* (2006.01)
*F24F 11/30* (2018.01)
*F24F 11/35* (2018.01)

(58) Field of Classification Search
USPC .......................................................... 454/369
See application file for complete search history.

(56) References Cited

U.S. PATENT DOCUMENTS

| | | | | |
|---|---|---|---|---|
| 3,633,600 | A | * | 1/1972 | Sadamori ............. C10M 135/32 126/287.5 |
| 4,310,012 | A | | 1/1982 | Billington et al. |
| 9,428,943 | B2 | | 8/2016 | Mitchell et al. |
| 2010/0117379 | A1 | | 5/2010 | Mitchell et al. |
| 2013/0205692 | A1 | * | 8/2013 | Hubbard ................. A62C 2/24 52/173.3 |
| 2015/0111489 | A1 | * | 4/2015 | Chopra ............... F24F 13/1426 454/333 |
| 2017/0065839 | A1 | * | 3/2017 | Weber .................... A62C 2/242 |

FOREIGN PATENT DOCUMENTS

| | | |
|---|---|---|
| EP | 0 118 230 A1 | 9/1984 |
| WO | 01/50049 A1 | 7/2001 |
| WO | 2014009965 A1 | 1/2014 |

OTHER PUBLICATIONS

Communication dated Oct. 31, 2018 by the Intellectual Property Office of the P.R.C in application No. 201580013499.2.

* cited by examiner

LOCKING DEVICE FOR A DAMPER ACTUATOR

CROSS REFERENCE TO RELATED APPLICATIONS

This application is a National Stage of International Application No. PCT/EP2015/055072 filed Mar. 11, 2015, claiming priority based on Swiss Patent Application No. 00366/14, filed Mar. 12, 2014, the contents of all of which are incorporated herein by reference in their entirety.

The present invention relates to a locking device for a damper actuator, a damper actuator, a fire protection unit as well as to a method for operating a damper actuator. The present invention relates in particular to a locking device for a damper actuator that is designed to arrest or lock the damper actuator in the locking position in the case of a fire, if a locking temperature is exceeded.

PRIOR ART

Damper actuators are used in fire protection units for actuating dampers, in particular fire dampers.

Fire dampers are installed in buildings for preventing a transfer of fire and smoke into air ducts, for example in walls and ceilings between building sections. In its function as a smoke and fire barrier, the fire damper is opened in the normal position during normal operation, in order to allow the passage of air in the air duct, and is closed in the safety position in the case of a fire, in order to prevent any transfer of fire and smoke through the air duct. However, depending on the ventilation and smoke extraction concept it is conversely also possible to configure and design a damper and the actuator thereof as a smoke extraction damper. This can be opened into a safety position in the case of a fire so as to allow the extraction of smoke through the air duct. The fire dampers and smoke extraction dampers are, in the installed condition, coupled with a damper actuator which it moves, in the case of a fire, from the normal position into the safety position. With regard to a change in the damper position, the term "move" or "actuate" of a damper means, in correspondence with their meaning in ordinary language, the "movement" or "actuation" of a damper element associated with a damper, which is used for closing the air duct, whereas the overall damper may also include further components such as bearings, frames and mounting elements.

A damper actuator will be assumed below to be a motorized damper actuator with a spring return. Such damper actuators are available from BELIMO Automation AG, Zurich, Switzerland. In these damper actuators, an output shaft of the damper actuator, which is coupled to the actuated fire damper, is, during normal operation, actively held in its normal position by an electric motor against the force of a return spring. In the case of a fire, the power supply to the motor is interrupted, which is carried out for example by means of a thermal trip, an electronic trip, for example a smoke detector, or a combination thereof. Upon interruption of the power supply to the motor, the output shaft is moved into the safety position by the force of the return spring, which output shaft is coupled to the return spring and to the motor via a transmission.

However, the design of the actuator is not crucial in the context of the present invention. The present invention may in principle be used in the same way in purely motorized damper actuators without a spring return.

EP 0118230 A1 discloses a safety actuator for a valve that is rotationally driven by means of a rotary spring. During normal operation, the rotary spring is kept in a tensioned condition by fusible connection elements. Above a melting point, the connection elements melt, whereupon the rotary spring is relaxed, thus moving the valve into a safety position. In principally the same way, WO 0150049 A1 discloses a rotary spring drive for an overpressure valve, in which the tensioned rotary spring is released by melting a fuse.

DE 3126214 A1 discloses a shut-off device driven by a rotary spring, in particular for gas lines. During normal operation, the rotary spring is held in a tensioned condition by means of a locking bolt that deforms under the influence of heat. Above an activation temperature, the locking bolt deforms and thus releases the actuator, whereupon the rotary spring is relaxed and thus moves the shut-off device into a position in which it shuts off the gas line. The locking bolt may for example be made from an easily melting material such as lead or may comprise an expanding element.

U.S. Pat. No. 4,310,012 discloses a safety device for tank trucks, which comprises a fuse and a shut-off valve. Once a threshold temperature is exceeded, the fuse melts, so that the shut-off valve is driven closed by a spring.

DESCRIPTION OF THE INVENTION

In order to fulfil its purpose, it is required that a fire damper remains in its safety position during the entire fire event. Above all, in the case of a longer lasting fire, this is technically challenging due to the high temperatures prevailing in such a case. Thus, in this respect there is a need to develop known damper actuators further in order to further enhance the safety level of such actuators.

It is an object of the present invention to provide damper actuators, fire protection units and methods for operating fire protection units, which do not have at least some of the disadvantages of the known systems. It is in particular an object of the present invention to provide devices and methods which hold a fire damper in its safety position, in particular in the case of longer lasting fires or in the case of extreme fire temperatures.

According to the present invention, these objects are achieved in particular by means of the elements of the independent claims. Further advantageous exemplary embodiments can moreover be seen from the dependent and coordinate claims as well as from the description.

According to a first aspect, the objects of the present invention are achieved by providing a locking device for a damper actuator. In the mounted condition, the locking device forms here a component or an assembly of the damper actuator. The locking device can be transferred from an idle condition into an alternative activated condition by way of activation.

The locking device comprises a locking element, which locking element is movably supported and can as a result be moved between a release position adopted in the idle condition and a locking position adopted in the activated condition. In the locking position, the locking element arrests or locks an output member of the fire protection actuator in a safety position. In the release position, however, the locking element allows a movement of the output member by means of the components of the damper actuator which are installed the output member.

The locking device further comprises an actuation element. The actuation element is designed in such a way that it moves, in the case of the activation of the locking device, the locking element from the release position into the locking position; to this end, the actuation element provides an actuation force and applies the actuation force onto the locking element.

The locking device further comprises an activation element that is operatively connected to the locking element and the actuation element. If a locking temperature is exceeded, an irreversible change in the shape of the activation element takes place, as a result of which the locking device is activated. The irreversible change in the shape may in particular consist in a complete or partial melting of the activation element and thus in a loss of its defined form. The change to the shape may, alternatively or in addition, also include combustion or evaporation. In any case, the change in the shape will lead to a failure of a function previously fulfilled by the activation element and thus to an activation of the locking device.

In some embodiments, the activation element may be made from a thermoplastic material. An activation element of a thermoplastic material melts at a melting temperature corresponding to the locking temperature and as a result changes its shape. Alternatively, the activation element may also be made from another material, e.g. from a duroplastic material. What is essential in this context is that the activation element has a function below the locking temperature which is lost or fails when the locking temperature is reached or exceeded.

In further embodiments, the activation element is realized by an adhesive connection that fails above the locking temperature.

In some embodiments, the actuation element applies, in the idle condition, an actuation force onto the locking element which acts in the direction of the locking position. The activation element holds the locking element in this condition in the release position against the actuation force. Accordingly, for such an embodiment the actuation force necessary for moving the locking element from the release position into the locking position is continuously applied onto the locking device. In the idle condition, however, the actuation force is compensated or cancelled by a retention force exerted by the activation element; this means that the activation element has a retaining function. Due to the change in the shape of the activation element upon reaching the locking temperature, the retaining function fails and the retention force on the locking element is removed. Correspondingly, the locking element moves into the locking position due to the still acting actuation force.

In alternative embodiments, the activation element, in a condition prior to the activation of the locking device, decouples the locking element from the actuation element and thus from the actuation force. Due to the change in the shape of the actuation element upon reaching of the locking temperature, the decoupling fails, so that the actuation force is applied onto the locking element. In such an embodiment, the activation element may be mounted to the damper actuator, e.g. a chassis or a housing element of the damper actuator, in a stationary manner and can absorb the actuation force exerted by the actuation element, as a result of which the locking element is decoupled from the actuation force. Due to the change in the shape of the locking element, for example by melting, combusting and/or evaporating, the actuation element applies the actuation force onto the locking element.

In some embodiments, the locking element includes a locking element sided positive-locking element which, in the release position, is connected in a positive locking manner to an activation element sided positive-locking element of the activation element. This positive lock ensures that below the locking temperature, the locking element remains in the release position. The activation element sided positive-locking element may, for example, be formed by a convex positive-locking element, which in the release position, engages in a corresponding concave positive-locking element of the locking element and as a result latches on to the latter; in doing so, the concave positive-locking element forms the locking element sided positive-locking element. Expediently, at least one of the positive-locking elements is designed in a spring-loaded manner to produce the locking from a non-locked initial position during mounting or assembly, for example as one or more spring-loaded catch (es). When the locking temperature is exceeded, the change in the shape of the activation element leads to a failure of the positive lock and thus to a release of the locking element. Alternatively, the arrangement of the concave and the convex element may be swapped around with the same effect. In further elements, the locking element and the activation element may be equipped with catches that are associated with each other and latch onto each other in the release position.

In further alternative embodiments, the activation element is rigidly connected to the locking element and forms a constructive unit with the latter. In the idle condition, the locking element is here mechanically coupled to a counter-element provided on the damper actuator in a stationary manner. The constructive arrangement of the elements may here be carried out principally in the same way as explained above.

In some embodiments, the actuation element comprises a spring that acts between the locking element and a support element. The support element is here mounted in a stationary manner in relation to the damper actuator and forms a counter-support for the spring that provides the actuation force. The spring may be designed in various ways that are principally known. In favorable exemplary embodiments, the spring is implemented as a curved leaf spring. As an alternative to an actuation by means of a spring, the actuation element may also be designed in such a way that it develops its actuation force only on the basis of the fire temperature, below the locking temperature. In such embodiments, the actuation force may be provided in particular as a result of thermal expansion of the actuation element.

In some embodiments, the locking element is secured in the locking position in a force-locking and/or a positive-locking manner after its movement into the locking position. Such an embodiment prevents an undesired release of the output member of the fire protection element after an activation of the locking device. If the actuation force is provided by a spring in the manner described, the locking element may be retained by a retention force applied by the spring in the locking position. Alternatively or in addition, further retaining elements may be provided for retaining the locking elements in the locking position. Such further retaining elements may in particular comprise a retention spring. Alternatively or in addition, the locking element may be secured in the locking position by another form-locking connection, for example by means of a catch arrangement or a combination of a concave and a convex latching element as shown above. For such an arrangement, the locking element is secured in the locking position independently of the force exerted by the actuation element.

In some embodiments, the locking element constitutes a stop for the output member in the locking position. The stop prevents a movement of the output member out of the safety position. Alternatively or in addition, the output member and the locking element can form another positive lock that fixes the output member in the safety position.

In some embodiments, the locking element comprises a rotationally supported locking catch or a rotationally supported locking lever.

In some embodiments, the output member comprises a rotationally supported output shaft that can be moved between a normal position and the safety position. In such an embodiment, the locking device is designed for locking a rotary damper actuator. Such a rotary damper actuator is used for actuating conventional rotationally moved dampers. Alternatively, however, the damper actuator may also be designed for realizing other actuating movements, in particular translatory or linear actuating movements. In such an embodiment as a linear actuator, the damper actuator may be used for actuating dampers designed as slides.

In some embodiments, the locking element is not operatively connected to the output member in the release position. For such embodiments, the output member of the damper actuator can be moved, in the release position, between the normal position and the safety position without any influence of the locking element. Such a damper actuator equipped with such a locking device behaves, in the idle position of the locking device, in the same way as a damper actuator without a locking device. As a result, it is in particular ensured that in the case of an undesired operation of the damper actuator, e.g. due to a false alarm, no locking of the output member is carried out, so that a return into the normal position is possible. The same applies in the case of the intended control of the damper actuator in the absence of a fire, for example for testing purposes.

In some embodiments of the locking device, the locking temperature is in a range of 120° C. to 350° C. Special aspects of such an embodiment will be explained below in the overall context of fire protection units according to the invention.

According to a further aspect, the objects of the present invention are achieved by providing a damper actuator, wherein the damper actuator has a locking device according to the invention. In some embodiments, the damper actuator is designed as a motorized damper actuator. Such a motorized damper actuator may be designed in particular as a motorized damper actuator with a spring return. As mentioned above, however, the locking device can be used in an actuator without a spring return.

In its mounted condition, the locking device according to the invention forms an assembly of the damper actuator according to the invention. The locking device may be attached for example to a chassis portion or to any other housing portion of the damper actuator and may also be located completely within a housing of the damper actuator.

In an alternative to the above-described embodiments, the locking element, the actuation element and the activation element are realized in an integral manner. In such an embodiment, the locking element comprises a reservoir for a foamable material that foams upon exceeding the locking temperature and as a result locks the output member, in particular by way of a positive lock and/or a force lock. The reservoir may be provided in a compact form, e.g. in a cartridge (or distributed within the damper actuator, e.g. as a lining for all or part of an inner housing wall and a plurality of inner housing walls). The foamable material may act directly on the output member, e.g. in the area of the support and/or the toothing thereof, as well as alternatively or in addition on components of the damper actuator that are located upstream in the force flux. Further, the foamable material may wholly or partially fill the inner housing space of the damper actuator in the foamed condition.

According to a further aspect, the objects of the present invention are achieved by providing a fire protection unit. The fire protection unit comprises a damper actuator according to the invention, in correspondence with the present invention, and a damper driven by the output member of the damper actuator. The fire protection unit further comprises a trigger operatively coupled with the damper actuator. The trigger controls the damper actuator during operation in such a way that the damper actuator moves the output member and the damper actuated thereby upon triggering from a normal position into the safety position.

In some embodiments of the fire protection unit, the trigger is designed in such a way that it triggers in the case of fire prior to the locking temperature being reached. For conventional thermal triggers, the usual temperatures at which the fire protection unit is triggered are e.g. 72° C., 95° C. or 105° C., whereas the locking temperature is e.g. in a range of 120° C. to 350° C. and thus markedly above the trigger temperature of the trigger. Electronic sensors such as smoke detectors are also triggered below the locking temperature. In such an arrangement, like in known damper actuators and fire protection units, a movement of the output member and thus of the actuated damper into the safety position is initially carried out in the case of fire. The locking device and thus locking of the output member will only occur in the case of a longer lasting fire and the associated exceeding of the locking temperature. Once the locking device has been activated, a simple return of the output member into the normal position by controlling the damper actuator is no longer possible.

According to a further aspect, the objects of the present invention are achieved by providing a method for operating a damper actuator. The method includes:
  in the absence of a fire: holding an output member of the damper actuator in a normal position and holding a locking element of a locking device of the damper actuator in a release position;
  detecting the existence of a fire;
  in the presence of a fire: moving the output member from the normal position into a safety position whilst the locking element stays in the release position;
  if a locking temperature is exceeded after a movement of the output member into the safety position: moving the locking element from the release position into a locking position, in which the locking element locks the output member in the safety position, said movement of the locking element being triggered by an irreversible change in the shape of an activating element of the locking device.

The method for operating a damper actuator may in particular be carried out by means of a damper actuator according to the present invention. Disclosed embodiments of a damper actuator or a fire protection unit according to the invention thus disclose at the same time corresponding embodiments of the method for operating a damper actuator.

BRIEF DESCRIPTION OF THE DRAWINGS

An embodiment of the present invention will be described below by way of an example. The example of the embodiment will be illustrated by the following attached figures:

FIG. 3a, 3b show the locking device of the damper actuator as a separate assembly in the mounted condition;

MODES FOR CARRYING OUT THE INVENTION

Figure 1:
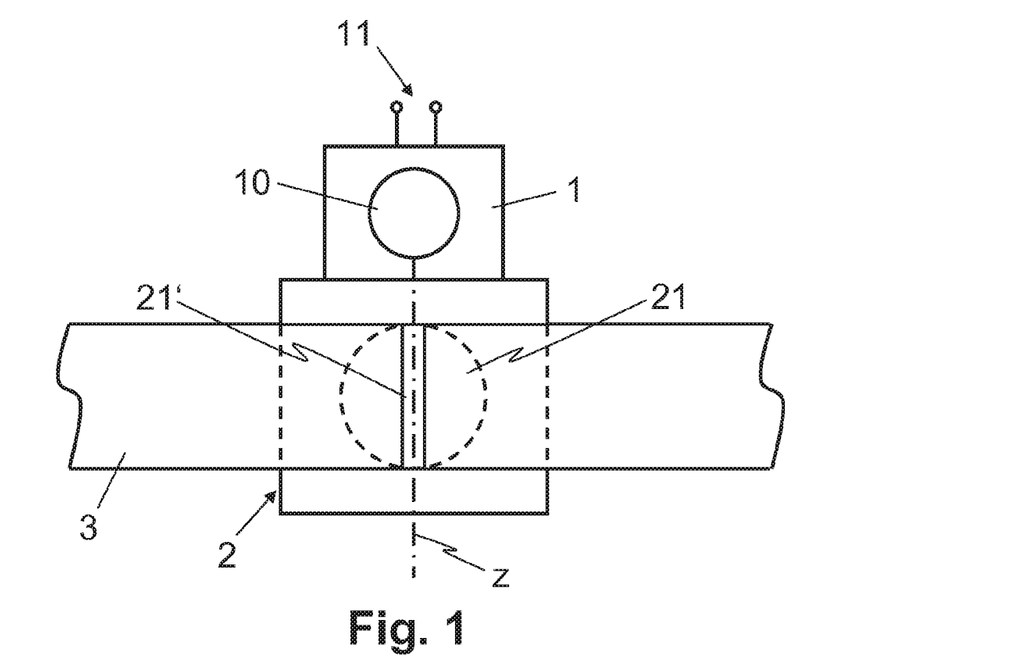
FIG. 1 shows a schematic cross-sectional view of a damper with a damper actuator, which damper is connected on both sides to an air duct.

In FIG. 1, reference numeral 2 relates to a damper which is here used by way of example as a fire damper. The damper 2 is connected to an air duct 3, for example a pipe with a circular or a rectangular cross section. The passage through the air duct 3 is controlled by the position of a fire damper element 21, 21' of the fire damper 2, which can be rotated about a rotary axis z. The fire damper element 21, 21' is moved and held, respectively, in its position by a damper actuator 1 connected to the fire damper 2. The damper actuator 1 is preferably designed as a spring return actuator and comprises an electric motor 10 as well as a return spring (not shown separately). In the configuration as a fire damper, the damper element 21, 21', or the fire damper 2, is held during normal operation in the open position (normal position) by the motor 10 that has a voltage 11 applied thereto, as is indicated with the reference numeral 21. In the case of a fire, the power supply to the motor 10 is interrupted and the fire damper 2 is moved into the closed position (safety position) by a spring of the actuator 10, as indicated with the reference numeral 21'.

Figure 2:
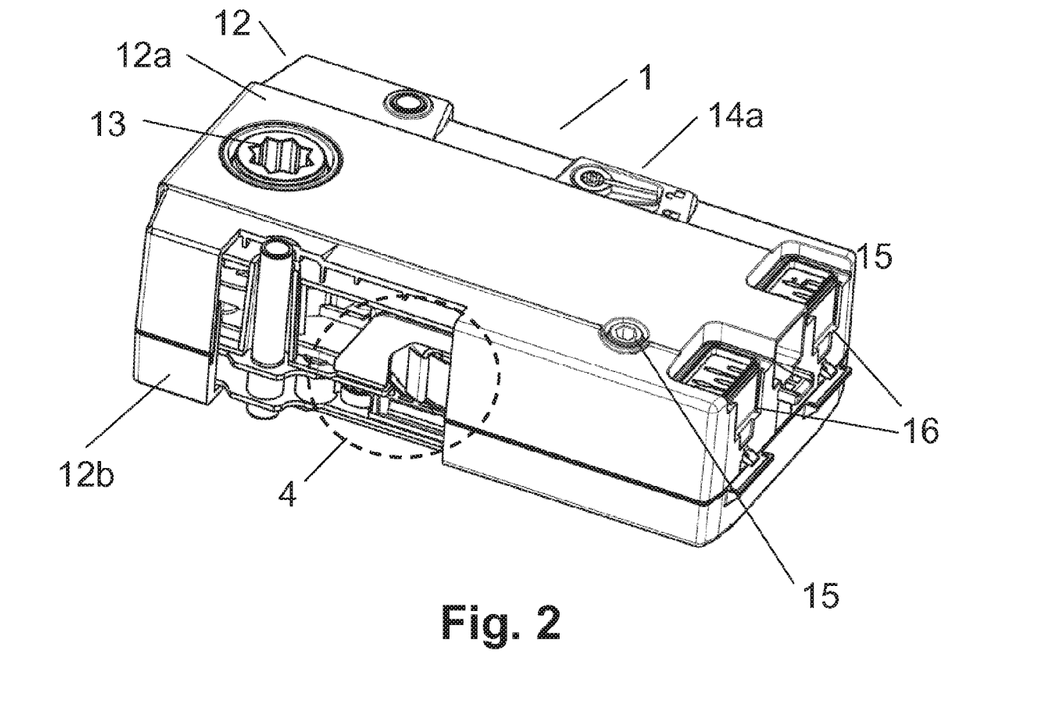
FIG. 2 shows a damper actuator with a partially removed housing.

Reference will also be made below to FIG. 2. FIG. 2 shows a damper actuator 1 having a partially removed housing 12. The damper actuator 1 is a motorized damper actuator with a spring return, as is principally known in the prior art and has been previously described. The damper actuator 1 has, as will be explained in more detail below with reference to FIG. 6, an output shaft 13 as the output member for coupling the fire damper 2 to be actuated. By way of example, the output shaft 13 is implemented as a hollow shaft with a star-shaped inner contour, which is provided for a non-rotating reception of an input shaft of the fire damper 2. The damper actuator 1 is further equipped with an optional manual operating unit 15, which will be explained in more detail below with reference to FIG. 7, for moving the output shaft 13 without the motor 10. The damper actuator 1 is further equipped with an also optional arresting device, which will be explained in more detail below with reference to FIGS. 8a, 8b, 8c, of which one control element 14a can be seen in FIG. 2. Electrical terminals are jointly identified using reference numeral 16 and comprise terminals or feed lines for feeding the motor 10 with the voltage 11, for connecting a trigger as well as terminals of an optional auxiliary switch, which as a position switch detects whether the output shaft 13 is in its normal position or in its safety position.

Figure 9:
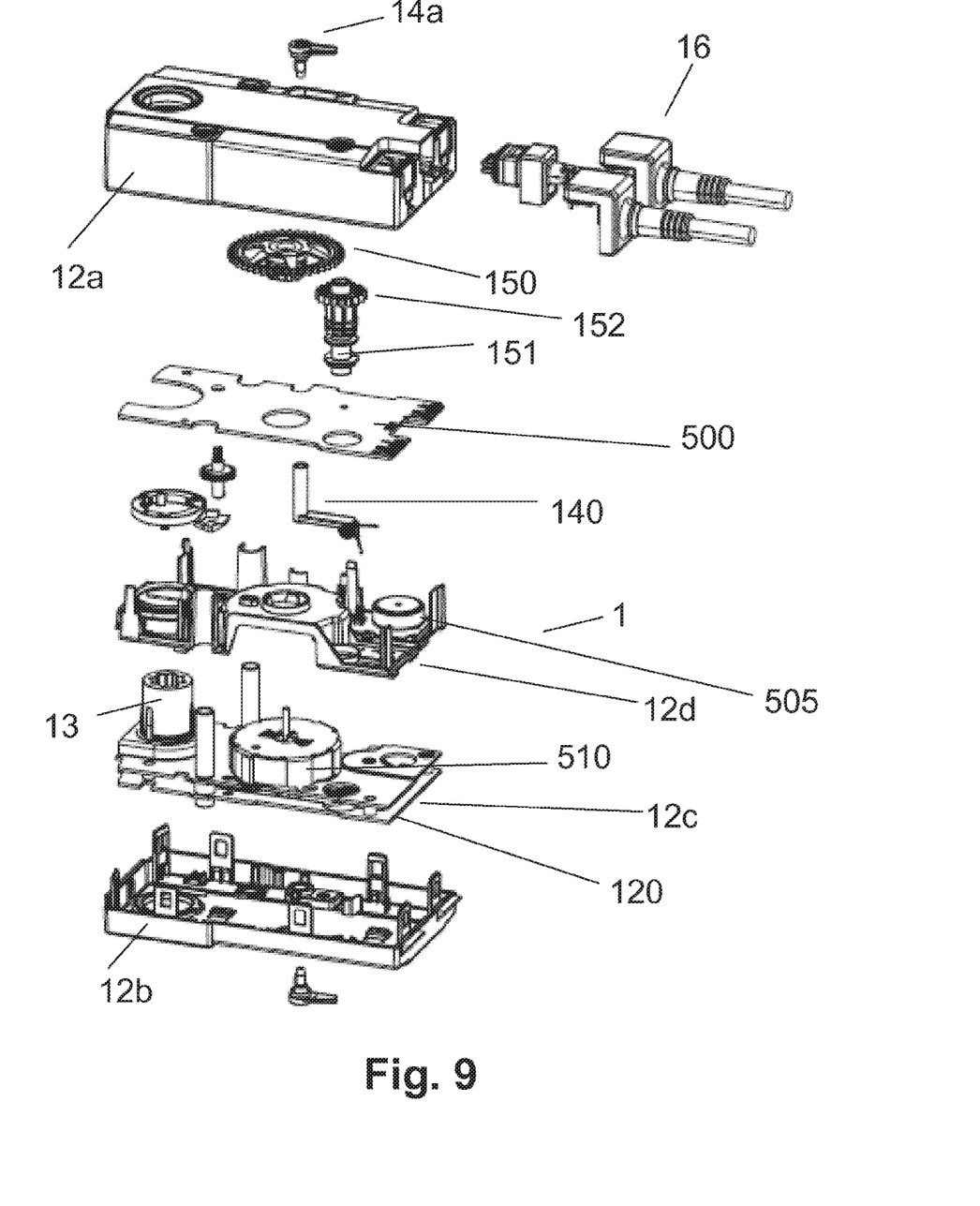
FIG. 9 shows the damper actuator in a simplified form with components spaced apart from each other (exploded view).

The housing 12 consists of two housing shells, which are connected to each other e.g. by means of screw connectors or snap connectors. All the openings and breakouts of the housing, e.g. for screwing the housing shells together, the output shaft 13, the manual operating unit 15 and the control element 14a of the locking device are sealed, and the sealing elements may be molded on as soft components to the housing shells, as a result of which the number of parts to be assembled is reduced. A simplified exploded view of the damper actuator 1 is shown in FIG. 9 and will be described below.

The damper actuator 1 is further equipped with a locking device 4 according to the invention, which is provided as an assembly within the housing 12. Although the damper actuator 1 shown in FIG. 2 is a motorized damper actuator with a spring return and a locking device according to the invention can advantageously be used in conjunction with such a damper actuator, such a design of the damper actuator for the locking device as described below is not mandatory and therefore has to be interpreted as being exemplary.

Figure 3A:
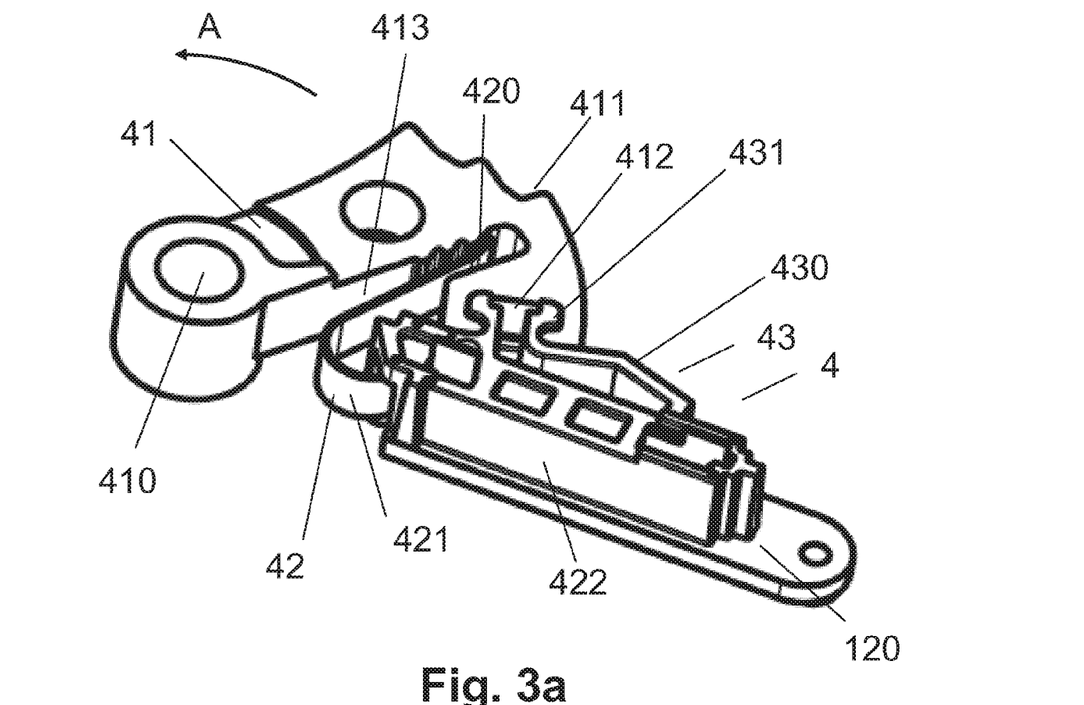
Figure 3B:
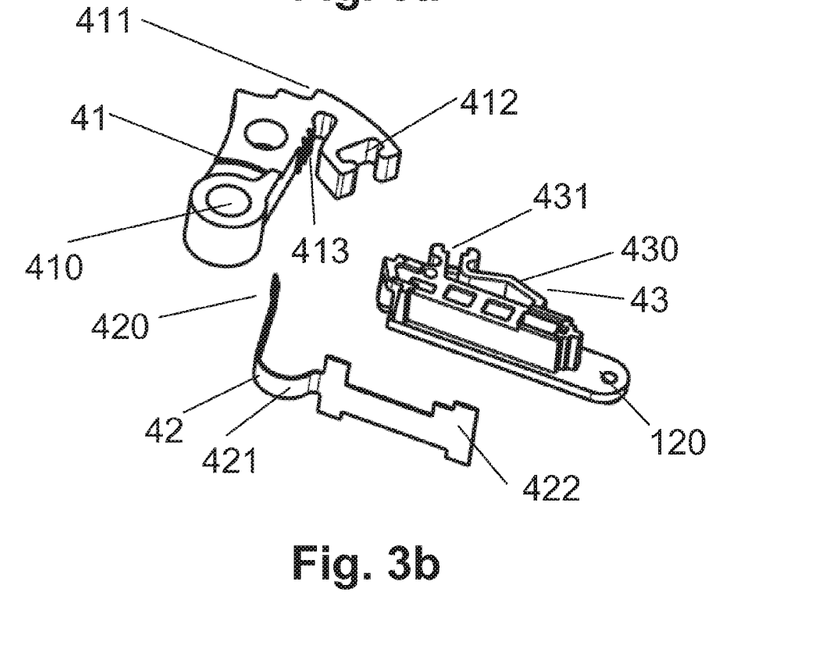
FIG. 3b shows the locking device of the damper actuator with components spaced apart from each other (exploded view)

Reference will additionally be made below to FIGS. 3a, 3b. FIG. 3a shows the locking device 4 of the damper actuator 1 as a separate assembly in the mounted condition, whereas FIG. 3b shows the assembly in an exploded view. The damper actuator 4 comprises the locking element implemented as a locking catch 41. The locking catch 41 has a hub 410, through which it is rotationally supported in the mounted condition by means of a support axis (not shown in FIG. 3). The support axis is mounted on a housing element of the damper actuator 1 in a stationary manner. Correspondingly, the locking catch 41 can carry out a pivoting movement about the hub 410 in or counter to the direction indicated by arrow A. In FIG. 3, the locking device 4 is shown in the release position in an idle condition, in which the locking catch 41 is in its release position.

The locking device 4 further comprises the actuation element 42 implemented as a curved leaf spring. A movable leg or an end segment 420 of the leaf spring 42 engages in a slot 413 of the locking catch 41 and as a result forms an operative connection for applying the actuation force onto the locking catch 41. The end segment 420 is connected to an end segment 422 resting opposite thereto via a U-shaped middle segment 421 that is responsible for generating the actuating force by the leaf spring 42.

The end segment 422 is designed substantially straight and has tabs (not referenced, can be seen only in FIG. 3b) for fastening in corresponding, for example slot-shaped, recesses or breakouts of a chassis element 120 of the housing 12 in a stationary manner. Thus, the chassis element 120 acts as a support element and a counter-bearing for the leaf spring 42. Alternatively or in addition, fastening to the housing 12 is possible also using further methods such as screwing, gluing, clamping, welding etc.

The locking device 4 further comprises the activation element implemented as a melting clamp 43. The melting clamp 43 further comprises a convex positive-locking element 431 that is realized by two oppositely located catches. In the idle position shown, the catches engage in a corresponding concave positive-locking element 412 of the locking catch 41. Due to the positive lock achieved thereby, the locking catch 41 is held in the release position against the actuation force exerted by the tensioned leaf spring 42 in the direction of the arrow A. As the counter-bearing for the fusing clamp 43, which receives the retention force, the housing 12, for example the chassis element 120 and/or the idle end segment 422 may be used.

By contrast to the locking catch 41, which is made from a material retaining its shape beyond the locking temperature, e.g. steel, the fusing clamp 43 melts upon exceeding the locking temperature and can thus no longer apply the retention force, so that the locking catch 41 pivots into the locking position as a result of the actuation force exerted by the leaf spring 42.

Figure 4:
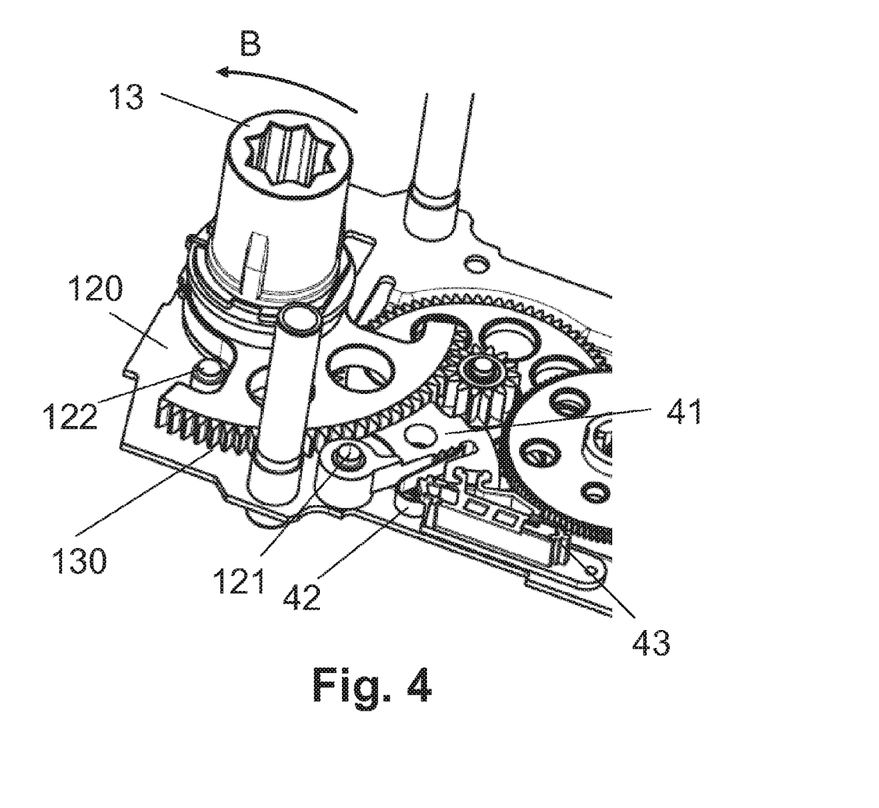
FIG. 4 shows the locking device together with further components of the damper actuator in the release position of the locking device and the normal position of the output member of the damper actuator.
Figure 5A:
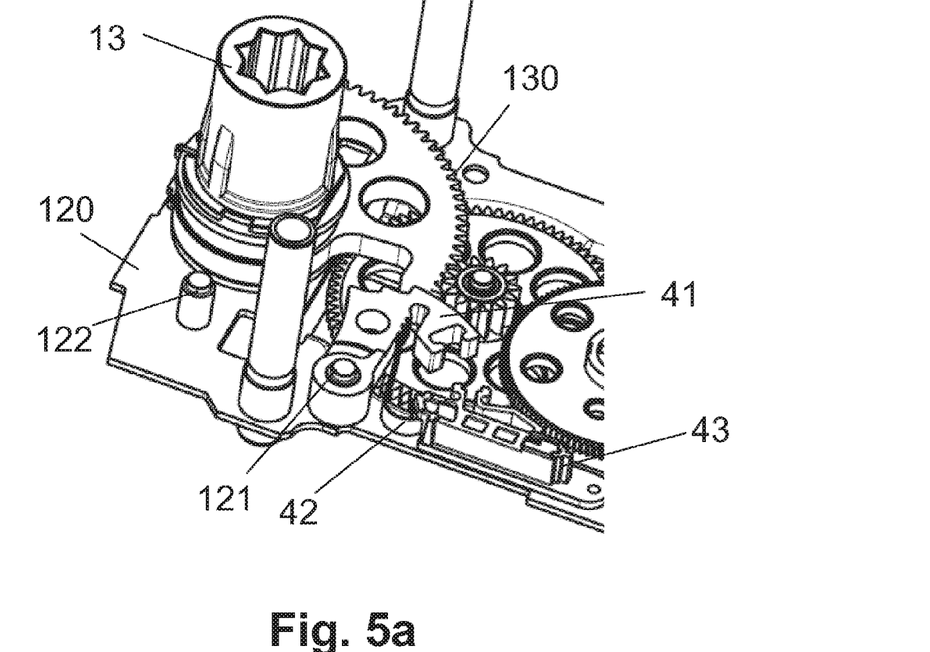
FIG. 5a, 5b show the locking device together with further components of the damper actuator in the locking condition of the locking device and in the safety position of the output member of the damper actuator.
Figure 5B:
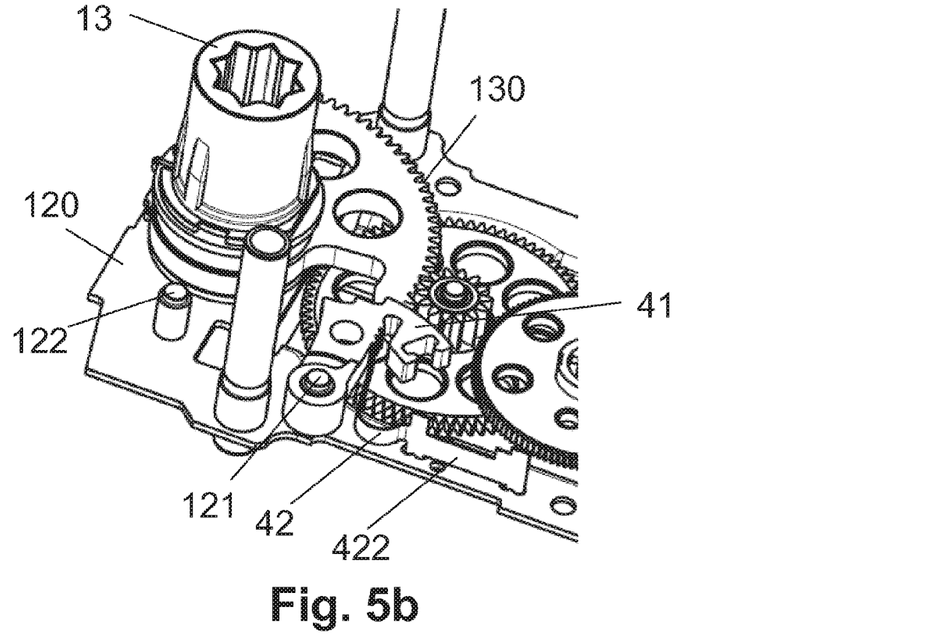

Reference will additionally be made below to FIGS. 4 and 5, which illustrate the function of the locking device in cooperation with further components of the damper actuator 1. FIG. 4 shows the situation in the idle condition, in which the output shaft 13 is in the normal position and the locking device 4, as in FIG. 3, is in the release position. The output member or the output shaft 13 has a gear segment 130 along part of its circumference, which is in engagement with further (not referenced) components of the damper actuator 1 provided in the power flux actuation-sided of the output shaft 13. The normal position of the output shaft 13 is defined by a stop of the gear segment 130 against a locking pin 122. The locking pin 122 protrudes from the chassis element 120.

If the motor voltage 11 is removed, the output shaft 13 is moved, as described above, into the safety position in the direction indicated by arrow B by means of the gear segment 130 in a spring-loaded manner via a rotation. In the course of this, the locking element remains in the release position (not shown). The output shaft 13 can, without triggering the locking device, be moved from the safety position back into the normal position by energizing the motor 10, i.e. by applying the voltage 11, as a result of which at the same time the return spring of the damper actuator is tensioned.

Reference will additionally be made below to FIGS. 5a, 5b. FIGS. 5a, 5b illustrate the situation upon activation of the locking device 4. FIG. 5b differs from FIG. 5a only in that for illustration, the clamp 43 is shown in FIG. 5a (in its original shape) and has been omitted in FIG. 5b. In practice, the clamp 43 will as a rule partially melt away. Once the retention force applied by the melting clamp 43 has been removed, the leaf spring 42 relaxes and in doing so moves the locking catch 41 into the locking position shown in FIG. 5 by way of a pivoting movement in the direction A about the bearing axis 121. In this locking position, a stop edge 411 of the locking catch 41 forms a stop for the gear segment 130 and permanently locks the output shaft 130 in the safety position.

During the movement from the release position into the locking position, the spring 42 is not completely tensioned. As a result, it applies in the locking position a retention force acting in the direction of the locking position onto the locking catch 41, as a result of which the locking catch 41 is secured in the locking position.

The structure and the function of the locking device described above and shown in FIGS. 3 to 5 can be modified in various ways.

Thus, the locking catch 41 of the embodiment shown acts directly on the output shaft 13. In the same way, the locking element can also act on another transmission element of the damper actuator 1, which is provided in the force flux on the actuation side of the output shaft 13, provided a rigid coupling with the output shaft 13 is ensured in the case of a fire. Further, the locking catch 41 can, in addition or as an alternative to the formation of a stop for the output shaft 13, be locked in a form-locking way with the output shaft 13 in the locking position, e.g. by means of a snap connection.

As an alternative or in addition to the exertion of a retention force on the locking catch 41 by the leaf spring 42, a retention force can also be exerted on the locking catch 41 in the locking position by a separate retention spring. In embodiments in which the locking catch 41 is locked in the locking position in a form-locking manner, a retention force is further not absolutely necessary.

The arrangement of a convex form-locking element 431 and the concave form-locking element 412 may be swapped around.

In the embodiment shown, the melting clamp 43 is disposed in the damper actuator 1 in a stationary manner and interacts in the release position with the locking catch 41 by means of the positive-locking elements 431 and 412. Alternatively, an activation element may be rigidly connected to the locking catch 41 and may form a structural unit therewith. In the release position according to FIG. 4, the locking catch 41 is here mechanically coupled with a counter-element provided on the damper actuator 1 in a stationary manner and is as a result held in the release position against the actuating force. Thus, in the embodiment according to FIG. 3 to FIG. 5, the activation element made from a thermoplastic material, may comprise the concave positive-locking element 412 and may be fixedly connected to the locking catch 41. As a counter-element, a convex positive-locking element mounted to the damper actuator 1 in a stationary manner may be used, which may in principle be designed in the same way as the convex form-locking element 431 shown.

In the embodiment shown, the actuation element in the form of the leaf spring 42 is mounted to the chassis element 120 of the housing 12 in a stationary manner. Alternatively, however, the leaf spring 42 may also be fixedly mounted to the locking catch 41 and may be supported on a counter-bearing that is arranged in a stationary manner on the chassis element 120 or on another part of the housing 12, and may in this way act between the counter-bearing and the locking catch 41. Further, instead of the leaf spring 42, another spring may be used as the actuation element, for example a coil spring acting as a tension or a compression spring.

Figure 6:
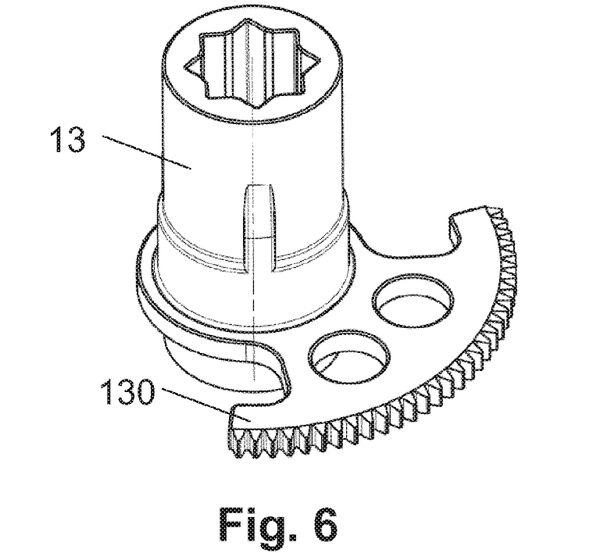
FIG. 6 shows an output shaft with a gear segment.

In the following, reference will additionally be made below to FIG. 6. FIG. 6 shows the output shaft 13 of the damper actuator 1 with a substantially rotationally symmetrical (cylindrical) body (not referenced), which forms the actual shaft, and a gear segment 130 fixedly connected thereto. The body and the gear segment 130 may be produced separately from different materials and/or using different manufacturing methods, and may subsequently be connected, in a known manner, e.g. by shrinking. Thus, for example, the body may be produced by a machining process and the gear segment 130 may be made by a sintering process. Alternatively, the output shaft is produced integrally in a primary shaping process, e.g. in a sintering process. An output shaft according to FIG. 6 may also be used in other damper actuators that do not have a locking device.

Figure 7:
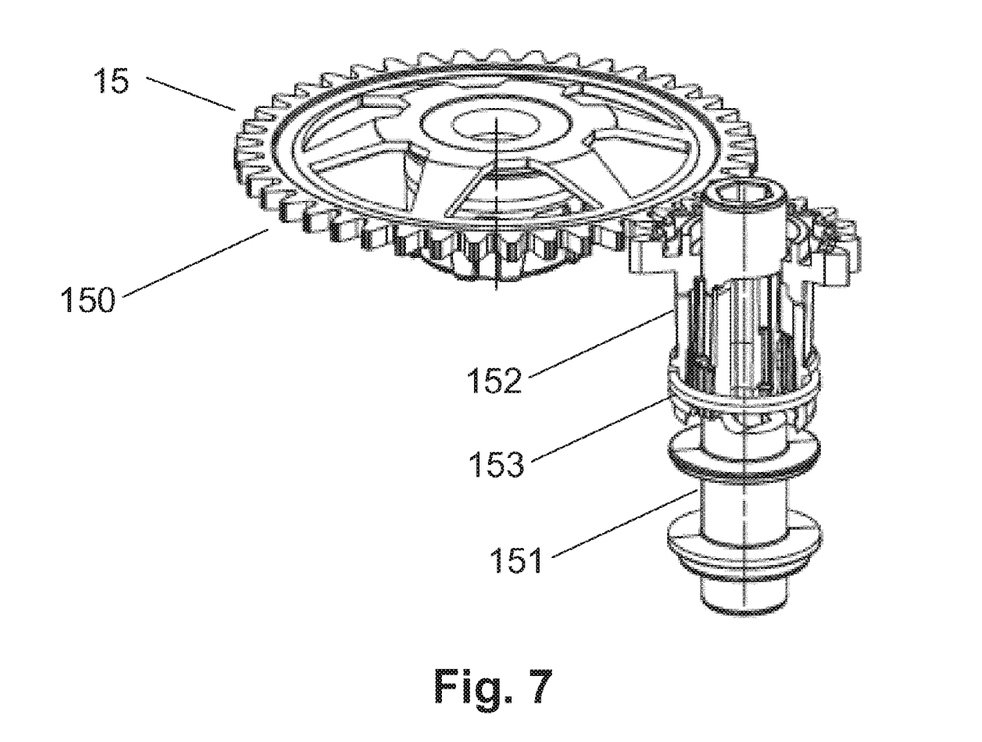
FIG. 7 shows a manual operating device for a damper actuator.

In the following, reference will additionally be made below to FIG. 7. FIG. 7 shows a manual operating device 15 as present for example in the damper actuator 1, which however may also be used in other damper actuators without a locking device. The manual operating device 15 shown is characterized by an integrated overload protection as will be explained below.

The manual operating device 15 has an operating shaft 151 supported in the housing 12 and having a hexagon socket (see also FIG. 2) that is coupled, for manual operation, with a separate operating element, e.g. a hand crank. For coupling, a hexagon socket as shown by way of example in FIG. 7 is provided (not referenced, see also FIG. 2). Coaxially around the operating shaft 151, a pinion 152 with a hub (not referenced) is provided, which meshes with a gear 150 that is seated in the force flux of the damper actuator. On part of its circumference, the operating shaft 151 shows an external toothing, whereas the hub of the pinion has a corresponding inner toothing that is in engagement with the outer toothing, with the tooth flanks being formed for example as inclined planes. Further, the hub of the pinion 151 is axially slotted over part of its length, so that its diameter can be elastically enlarged. Part of the hub is further surrounded by a pre-tensioning spring 153, which exerts a radial, inwardly directed pre-tensioning force onto the slotted hub. In this way, the pinion 152 is, up to a limit torque which is substantially determined by the pre-tensioning force and the toothing, non-rotationally connected to the operating shaft, so that it can, for a manual operation, transfer a torque onto the gear 150. If the limit torque is exceeded, the radial force acting on the toothing exceeds the pre-tensioning force exerted by the pre-tensioning spring 152, so that the hub diameter is elastically enlarged; as a result, the toothing is disengaged and the non-rotational connection is disconnected. In this way, an overload of the damper actuator 1 is prevented which would otherwise be possible in the case of a manual operation.

Figure 8A:
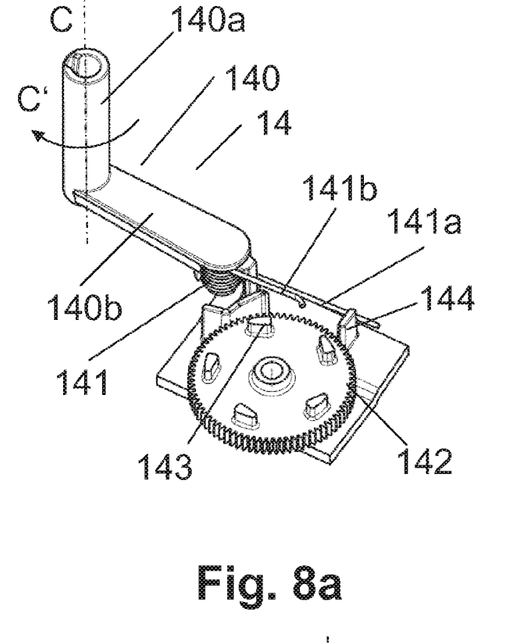
FIG. 8a, 8b, 8c each show an operating condition of an arresting device for a damper actuator.
Figure 8B:
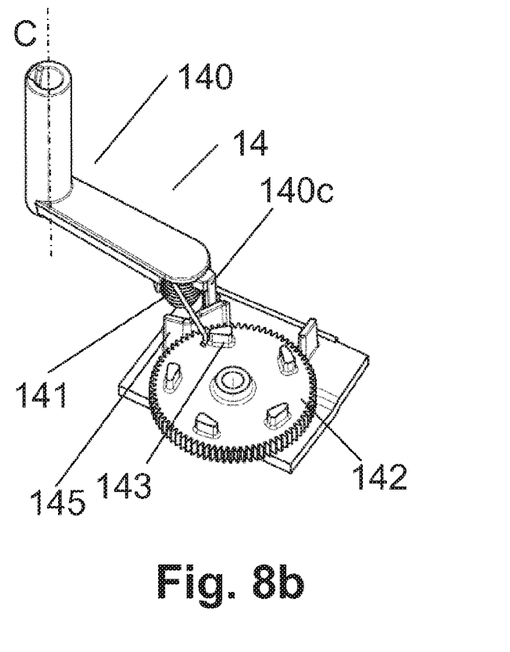
Figure 8C:
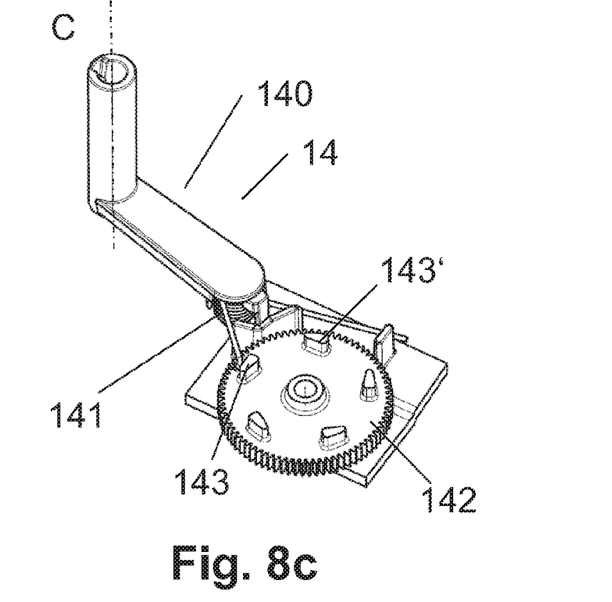

In the following, reference will additionally be made below to FIGS. 8a, 8b, 8c. FIGS. 8a, 8b, 8c show an arresting device 14, as is present for example in the damper actuator 1, but may also be used in other damper actuators without a locking device. The manual operating device shown is used in connection with a manual operating device 15 as described above. By means of the manual operating device and the arresting device, the output shaft may be moved into a desired position and secured there without the use of a motor, which may be required for example during commissioning as well as for testing and maintenance purposes.

The arresting device 14 comprises a crank-shaped operating lever 140 having lever elements 140a, 140b. The lever element 140a is supported in the housing 13 so as to be pivotable about the axis C and is moved or pivoted for operating the arresting device using an operating element 14a (see FIG. 2).

The arresting device 14 further comprises a gear 142 provided in the force flux of the damper actuator 1, from which gear a number of cams 143 protrude along the circumference thereof.

The arresting element further comprises an arresting spring 141 which is located on a side of the lever element 140b that is opposite the lever element 140a and is pivoted using the operating lever 140. The arresting spring 141 is formed as a coil spring and has at the ends thereof two radially protruding spring legs 141a, 141b, which spring legs are substantially parallel to each other in an undeflected position of the arresting spring 141. The spring leg 141a is fixed on an abutment 144.

FIG. 8a shows the arresting device 14 in a non-arrested position, in which the spring 141 and in particular the spring leg 141b is in operative connection with the cams 143; in this position, the gear 142 can move freely. The directions of movement are here such that the gear 142 rotates in the counterclockwise direction (view from above) in the case of a movement in the direction of the safety position driven by the return spring, and correspondingly in the clockwise direction opposite to the safety position.

FIG. 8b shows the arrested position which results from pivoting the operating lever 140 in the direction C'. In the case of a movement from the configuration according to FIG. 8a into the configuration according to FIG. 8b, the previously relaxed arresting spring 141 is tensioned because the spring leg 141a is fixed by the abutment 144 and cannot follow the pivoting movement. During the pivoting movement, the other spring leg 141b slides over a chamfered edge (not referenced) of a stationary guiding element 145 and eventually engages in a cut (not referenced) of the guiding element 145 as shown in FIG. 8b. In the case of a release of the manual operating device 15, the gear 142 moves under the force of the return spring in the clockwise direction, i.e. in the direction of the safety position, until a cam 143 abuts against the spring leg 141b. The arresting spring 141 now exerts a force that is directed opposite to the force of the return spring via the spring leg 141b and cancels the latter, so that the actuation remains arrested in this position.

A cancelling of this arrest, i.e. a transition from the configuration according to FIG. 8b to the configuration according to FIG. 8a, may be carried out both manually and by means of the motor of the damper actuator 1. For a manual cancelling of the arrest, the arrest lever is pivoted opposite to the direction C'. In this case, a pin 140c of the arresting lever 140 abuts against the spring leg 141b and lifts it off from the abutment 144, so that the spring leg 141b is disengaged from the guiding element 145 and snaps back into its idle position. In order to cancel the arrest by means of the motor, the output shaft 13 is moved in the direction opposite to the safety position, which means a rotation of the gear 142 in the clockwise direction; as a result, the cam 143 is lifted off from the spring leg 141b and the spring leg 143b also snaps back to its idle position due to the spring force of the arresting spring 141.

Such a motorized release of the arrest is advantageous for safety reasons. It is known that following an intended arrest, e.g. within the context of commissioning or maintenance, the latter will subsequently not be inadvertently released again, so that the actuator remains in the arrested position and the output member will not move into the safety position in the case of a fire. As a result of the automatic release of the arrest when the motor is energized it is ensured that the arrest will be cancelled in any case.

During a manual movement in a direction opposite to the safety position and subsequent locking it is possible without any further action for the actuator to be tensioned by the return spring in abutment to such a degree that the above-described release of the arrest by means of the motor is no longer possible. This occurs when the moment generated by the return spring and further present due to the inherent transmission elasticity exceeds the moment that can be applied by the motor.

As will be explained below with additional reference to FIG. 8c, the occurrence of such a situation will be prevented by the arresting device 14 shown. If the moment applied by the return spring exceeds an admissible maximum value, then the cam 143 that is in engagement with the spring leg 141b slides, starting from the configuration shown in FIG. 8b, via the outwardly bent free end (not referenced) so that the spring leg 141b releases the cam 143. The gear 142 can consequently, driven by the return spring, move in the direction of the safety position, in the course of which the free end of the spring leg 141b slides along the outer wall of the cam 143, until it finally loses its contact with the cam 143, as a result of which the spring 143 is relaxed. If the rotation of the gear 142 is continued, a subsequent cam 143' will finally abut against the spring leg 141b, as a result of which again the configuration according to FIG. 8b is reached. This process is repeated until the moment of the return spring no longer exceeds the maximum value, so that the arresting position according to FIG. 8b remains.

Thus, the arresting device 14 as a whole has the properties that it can be released both manually and by means of the motor and that the moment exerted by the return spring can be limited to a maximum value, at which the arrest can be released by means of the motor.

In the following, reference will additionally be made below to FIG. 9. FIG. 9 shows an exploded view of the damper actuator 1. The damper actuator 1 is realized as a multi-layered sandwich structure between the housing shells 12a, 12b. The essential components are received by two spaced-apart boards, wherein the bottom one of the boards is the board 120. Between the boards, in particular the transmission of the damper actuator 1 with the locking device 4 is provided. The upper one of the boards also supports the return spring 510. Above the boards 12c, a circuit board 500 is provided via an intermediate structure 12d that supports the motor 505, on which circuit board the control and drive circuitry for the motor 505 is located.

The invention claimed is:

1. A locking device for a damper actuator, wherein the locking device can be transferred by activation from an idle condition into an activated condition, and the locking device comprises:
   a locking element that is movably supported and moveable between a release position in the idle condition and a locking position in the activated condition and, in the release position, allows an output shaft of the damper actuator to be moved and, in the locking position, locks the output shaft in a safety position;
   an actuator operatively connected to the locking element that moves, upon activation of the locking device, the locking element from the release position into the locking position;
   an activation element that is operatively connected to the locking element and the actuator and irreversibly changes shape upon exceeding a locking temperature to activate the locking device,
   wherein the locking device changes from the idle condition to the activated condition by activation of the locking device, and
   in the idle condition, the activation element directly interacts with the locking element to hold the locking element against the actuation force in the release position.

2. The locking device as claimed in claim 1, wherein the activation element is made from a thermoplastic material.

3. The locking device as claimed in claim 1, wherein in the idle condition, the actuator applies an actuation force acting in the direction of the locking position on the locking element, and in the idle condition, the actuator holds the locking element against the actuation force in the release position.

4. The locking device as claimed in claim 3, wherein the locking element has a locking element sided positive-locking element, which positive-locking element is, in the release position, connected in a positive-locking manner to an activation element sided positive-locking element of the activation element.

5. The locking device as claimed in claim 1, wherein the actuation element comprises a spring acting between the locking element and the support element.

6. The locking device as claimed in claim 1, wherein the locking element is, after the movement thereof into the locking position, secured in the locking position in a force-locking and/or a positive-locking manner.

7. The locking device as claimed in claim 1, wherein in the locking position, the locking element forms a stop for the output shaft.

8. The locking device as claimed in claim 1, wherein the locking element comprises a rotationally supported locking catch or a rotationally supported locking lever.

9. The locking device as claimed in claim 1, wherein the output shaft is rotationally supported and is moveable between a normal position and the safety position.

10. The locking device as claimed in claim 1, wherein in the release position, the locking element is not operatively connected to the output shaft.

11. The locking device as claimed in claim 1, wherein the locking temperature is in a range of 120° C. to 350° C.

12. A damper actuator, comprising:
   an output shaft that operatively connects with a damper; and
   the locking device as claimed in claim 1.

13. The damper actuator as claimed in claim 12, wherein the damper actuator is a motorized damper actuator.

14. A fire protection unit comprising:
   a damper actuator as claimed in claim 12;
   a damper actuated by an output shaft of the damper actuator;
   a trigger operatively coupled with the damper actuator;
   wherein the trigger controls the damper actuator in such a way that the damper actuator moves the output shaft and the actuated damper when triggered from a normal position into the safety position.

15. The fire protection unit as claimed in claim 14, wherein the trigger is triggered in the case of a fire prior to reaching the locking temperature.

16. A method for operating a damper actuator, which method comprises:
   in the absence of a fire: holding an output shaft of the damper actuator in a normal position and holding, by an activation element, a locking element of a locking device of the damper actuator in a release position;
   detecting the existence of a fire;
   in the presence of a fire: moving the output shaft from the normal position into a safety position, whilst the locking element remains in the release position;
   if a locking temperature is exceeded after the output shaft is moved into the safety position, the activation element irreversibly changes shape allowing the locking element to move from the release position into a locking position that locks the output shaft in the safety position,
   wherein the locking element moves from the release position to the locking position by activation of the locking device, and
   prior to detecting the existence of the fire, the activation element directly interacts with the locking element to hold the locking element against an actuation force in the release position.

* * * * *